INVENTOR.
ROBERT A. RODNER
BY
Samuel Cohen
Attorney

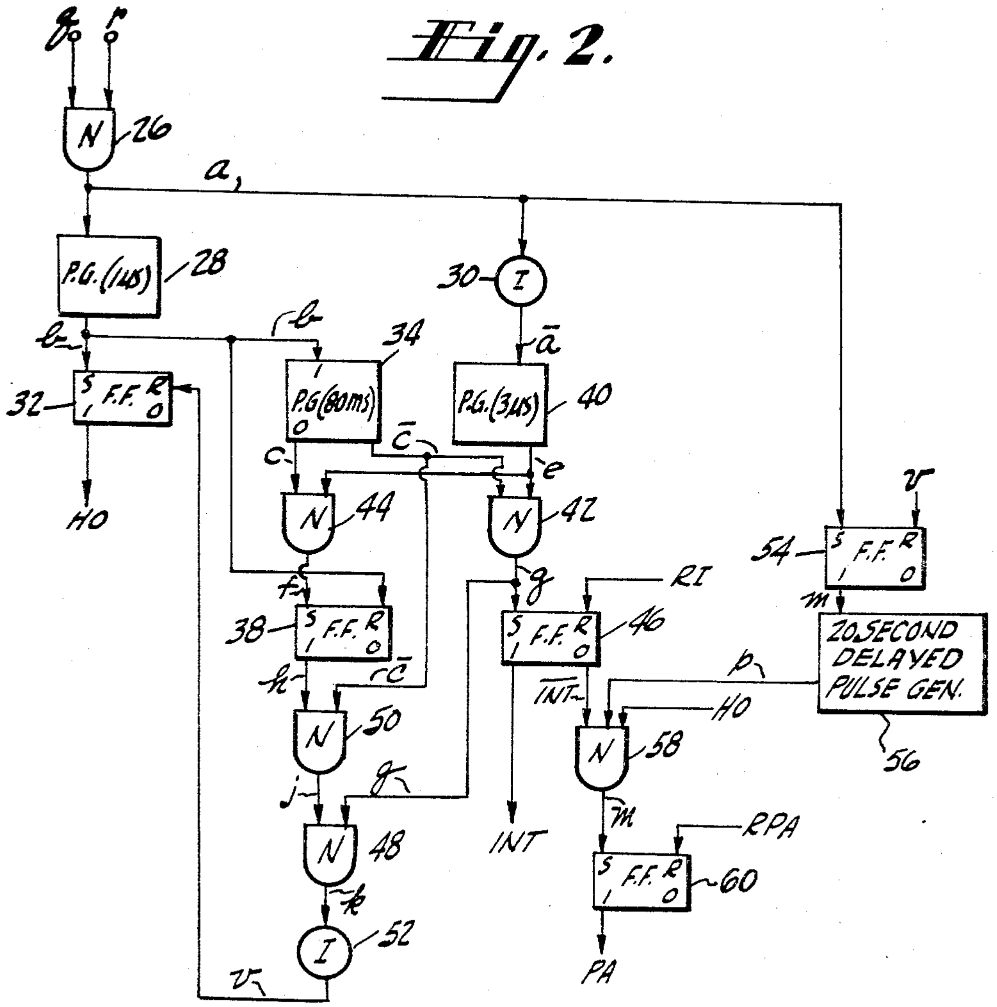
FIG. 2.
LEGEND:
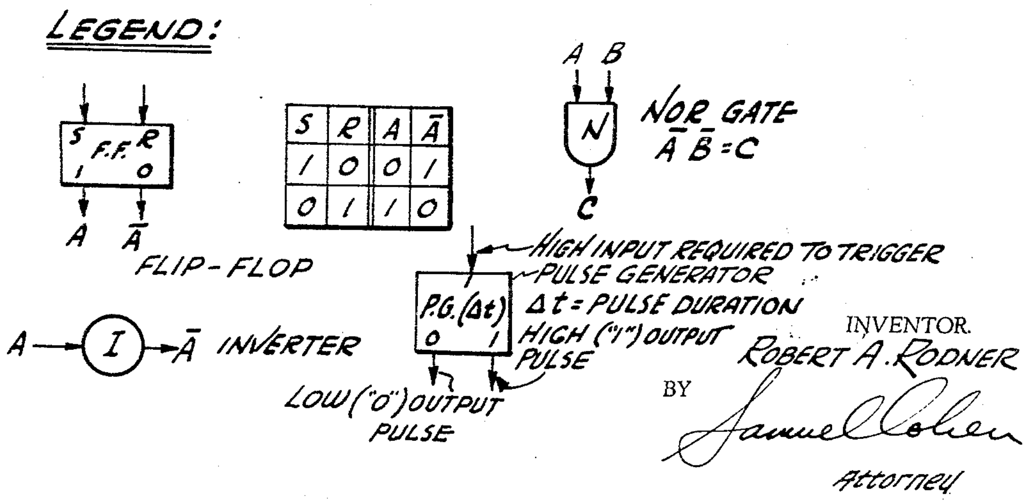
| S | R | A | Ā |
|---|---|---|---|
| 1 | 0 | 0 | 1 |
| 0 | 1 | 1 | 0 |
INVENTOR.
ROBERT A. RODNER
BY
Samuel Cohen
Attorney March 25, 1969
R. A. RODNER
3,435,129
CIRCUIT FOR DISTINGUISHING INTERRUPT SIGNAL FROM OTHER SIGNALS
Filed Aug. 6, 1965
Sheet 3 of 5

INVENTOR.
ROBERT A. RODNER
BY
James Cole
ATTORNEY

INVENTOR.
ROBERT A. RODNER
BY
Samuel Cohen
Attorney

INVENTOR.
ROBERT A. RODNER
BY
Samuel Cohen
Attorney

United States Patent Office 3,435,129
Patented Mar. 25, 1969

3,435,129
CIRCUIT FOR DISTINGUISHING INTERRUPT SIGNAL FROM OTHER SIGNALS

Robert A. Rodner, North Palm Beach, Fla., assignor to Radio Corporation of America, a corporation of Delaware Filed Aug. 6, 1965, Ser. No. 477,731
Int. Cl. H041 *15/00;* G11b *13/00;* G06f *1/00*
U.S. Cl. 178—3 5 Claims

ABSTRACT OF THE DISCLOSURE

A data transmission device such as a teletypewriter is capable of transmitting an interrupt signal and other signals to, for example, a data processing machine. A circuit is provided for distinguishing among these signals on the basis of pulse width discrimination. A relatively long first enabling signal is generated in response to receipt of the leading edge of a signal from the data transmission device and a second relatively short enabling signal is generated in response to the trailing edge of the device signal. A circuit responsive to the concurrent receipt of both enabling signals produces an output when the device signal is an interrupt signal but not when the device signal is shorter than an interrupt signal.

The invention is discussed in detail below and is shown in the following drawings, of which:

FIGURE 2 is a block circuit diagram of the present invention;

Figure 1:
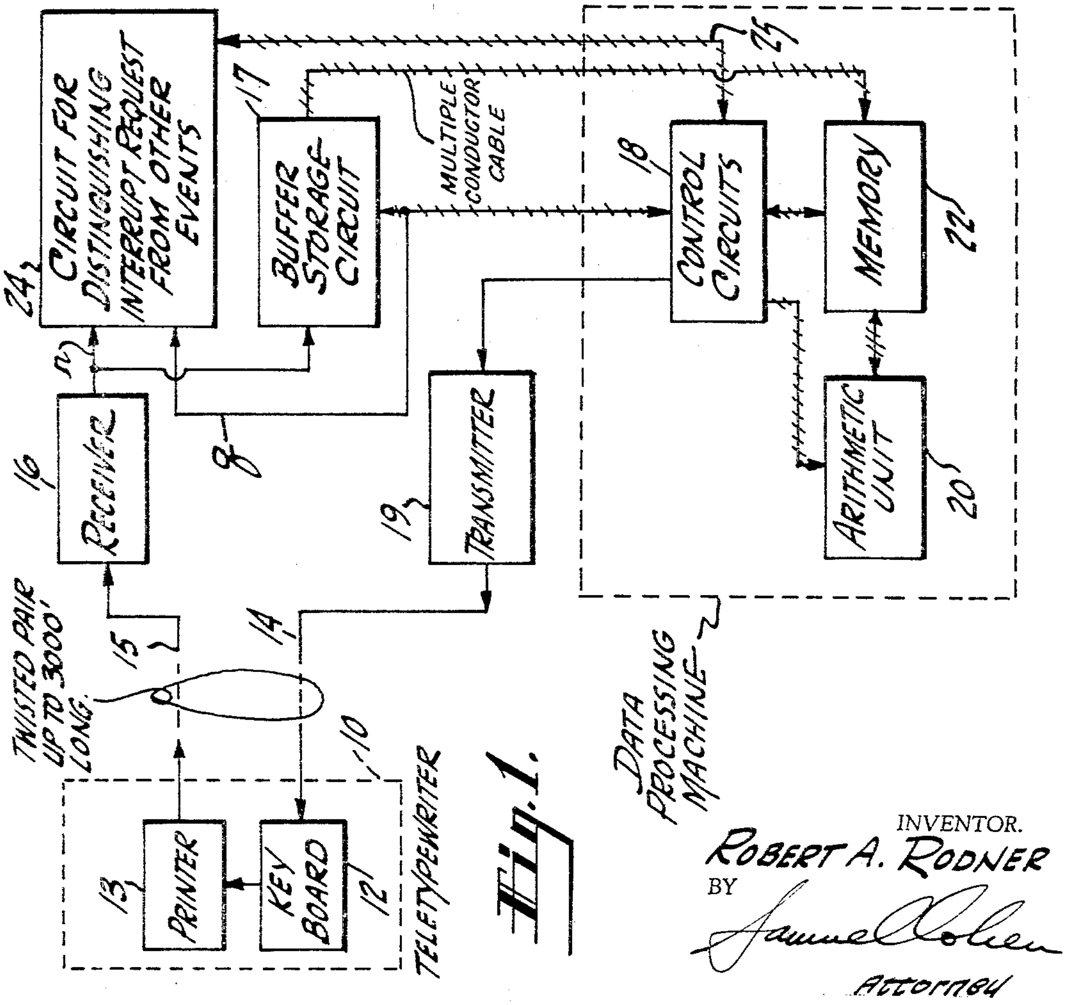
FIGURE 1 is a block circuit diagram of a teletypewriter interconnected to a data processing machine.

The teletypewriter 10, shown in FIGURE 1, is a standard unit which includes a keyboard 12 and a printer 13. A single pair of wires 14, 15, which may be up to 3000 feet long, connects the teletypewriter to the data processing machine. The wire 15 is connected through circuits in a line receiver 16, a buffer storage circuit 17, control circuits 18, and a transmitter 19 back to the wire 14. These circuits together provide a closed loop or current transmission path. There is normally current present in this loop at a level of twenty milliamperes in one particular practical installation.

The control circuits 18 are part of a data processing machine. They connect with the arithmetic unit 20 and memory 22 in well-known fashion.

In the operation of the system of FIGURE 1, the data processing machine 18, 20 and 22 may normally be operating at a relatively high speed. The teletypewriter, on the other hand, is capable of operating only at a relatively slow speed. The purpose of the teletypewriter is to apply data to or to receive data from the data processing machine. The keyboard of the teletypewriter includes a key, known as an "interrupt" key, and a number of additional keys for printing and transmitting numbers, letters, and other characters. When the operator desires to communicate with the data processing machine, he depresses the interrupt key. The result is to interrupt the flow of current on the line 14, 15 for an interval somewhat greater than 80 milliseconds and considerably less than 20 seconds (the value of 20 seconds is arbitrary and may instead be higher or lower than this figure). This interruption in current appears at *r* as a drop in voltage level.

The circuits 24, which are the subject of the present invention, are connected to the receiver 16. When the machine is running a normal program, the control circuits

18 apply a low level priming signal *q*, indicative of the bit 0, to one input to circuit 24. In this condition, the circuit 24 senses and determines whether or not the signal *r* derived from the teletypewriter is an interrupt request. After an interrupt request has been received and acknowledged, the data processing machine, at a time convenient to it, transmits the signal $q=1$ to the circuits 24. This disables the circuits 24 and indicates that the machine is ready to receive information from the teletypewriter.

Figure 6:
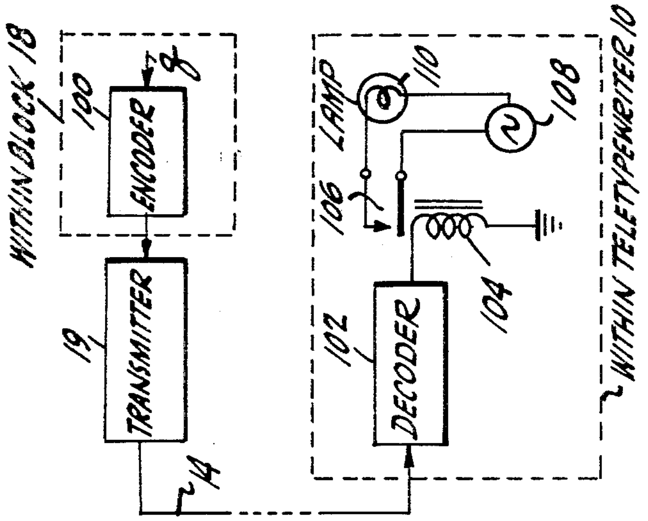
FIGURE 6 is a block circuit diagram showing some details of the system of FIG. 1.

The signal $q=1$ discussed above may also be employed to turn on a "send-light" at the keyboard. A block diagram of the circuit appears in FIG. 6. The signal *q* is applied to an encoder 100 within block 18. The latter generates a serial code and applies it through the transmitter 19 and line 14 to a decoder 102 located within the teletypewriter. In response to this code, the decoder actuates a relay 104 and causes its contacts 106 to close. These contacts complete the circuit between alternating current source 108 and the send-light 110.

When the send-light 110 goes on, the teletypewriter operater may transmit a message. The message is generated by sequentially depressing various character keys. Each time a character key is depressed, a group of signals having a total duration of 100 milliseconds is transmitted. This group of signals consists of a first 9.09 millisecond interval during which the current on lines 14 and 15 is interrupted, followed by an 81.81 millisecond interval during which the current on lines 14 and 15 is restored and interrupted in accordance with the code which represents the character being transmitted, followed by an 18.18 millisecond interval during which current is restored to the line 14, 15.

In a practical data processing machine installation of the type discussed generally above, it is important that the data processing machine not be interrupted unnecessarily. For example, from time to time an unauthorized person having no business at the teletypewriter may depress a key for a character. It is important that the depression of such a key not be interpreted by the data processing machine as a request for access to the machine. In other words, this type of unauthorized transmission should be ignored by the data processing machine.

In addition to the above, it sometimes occurs that there is a power failure at the teletypewriter or an actual physical severing of the relatively long transmission line 14, 15 as, for example, when struck by lightning. In both of these cases, just as in the case of the depression of an interrupt key, the current on the line 14, 15 drops to zero. It is important that the data processing machine distinguish this type of "signal" from the interrupt or "request for service" signal.

The circuit of the present invention, shown as a single block 24 in FIGURE 1, performs the tasks discussed above. The inputs to this circuit include *r* and *q*, as already mentioned. To repeat, *r* is a voltage indicative of whether or not a signal is present (current has reduced to zero) on the line 14, 15. The second signal *q* is one produced by the control circuits 18 for priming or disabling the circuits 24. The various output signals produced by the circuit 24 are applied to the control circuits 18. The latter, in turn apply the signal *q* and other signals (via bus 25) to circuit 24 and also control the operation of the buffer storage circuit 17 (which may be a shift register or the like), the memory 22, the arithmetic unit 20, and all associated circuits in a manner well understood in the art.

The circuit 24 is shown in detail in FIGURE 2. It includes a NOR gate 26 which receives as inputs the signals *q* and *r* just discussed. The output signal *a* of the NOR gate is applied to a pulse generator 28 and an inverter 30. Pulse generator 28 generates a 1 microsecond pulse *b* in response to a positive-going (a 0→1) input signal transition. The signal $b$ is applied as a set (S) signal to flip-flop 32, as a triggering signal to pulse generator 34, and as a reset (R) signal to flip-flop 38.

The $\overline{a}$ signal produced by inverter 30 is applied to pulse generator 40. The latter's three microsecond negative-going or 0 pulse is applied to both NOR gates 42 and 44. NOR gate 42 receives the signal $\overline{c}$ from pulse generator 34 as its second input and NOR gate 44 receives the signal $c$ as its second input. The $f$ output of NOR gate 44 is applied as a set signal to flip-flop 38 and the $g$ output of NOR gate 42 is applied as a set signal to flip-flop 46 and as an input signal to NOR gate 48.

The 1 output terminal of flip-flop 38 is connected to NOR gate 50. The second input to NOR gate 50 is the $\overline{c}$ output of pulse generator 34. The output $k$ of NOR gate 48 is applied through inverter 52 to the reset terminal of flip-flop 32.

The $a$ output of NOR gate 26 is applied to the set terminal of flip-flop 54 and the latter's output signal $n$ is applied to a 20 second counter and pulse generator 56. The latter circuit produces a pulse $p=0$ after a duration of 20 seconds and applies that pulse to NOR gate 58. A second input to NOR gate 58 is the output HO of flip-flop 32. A third input to NOR gate 58 is the $\overline{\text{INT}}$ output of flip-flop 46. The $m$ output of NOR gate 58 is a set signal for flip-flop 60.

Figure 3:
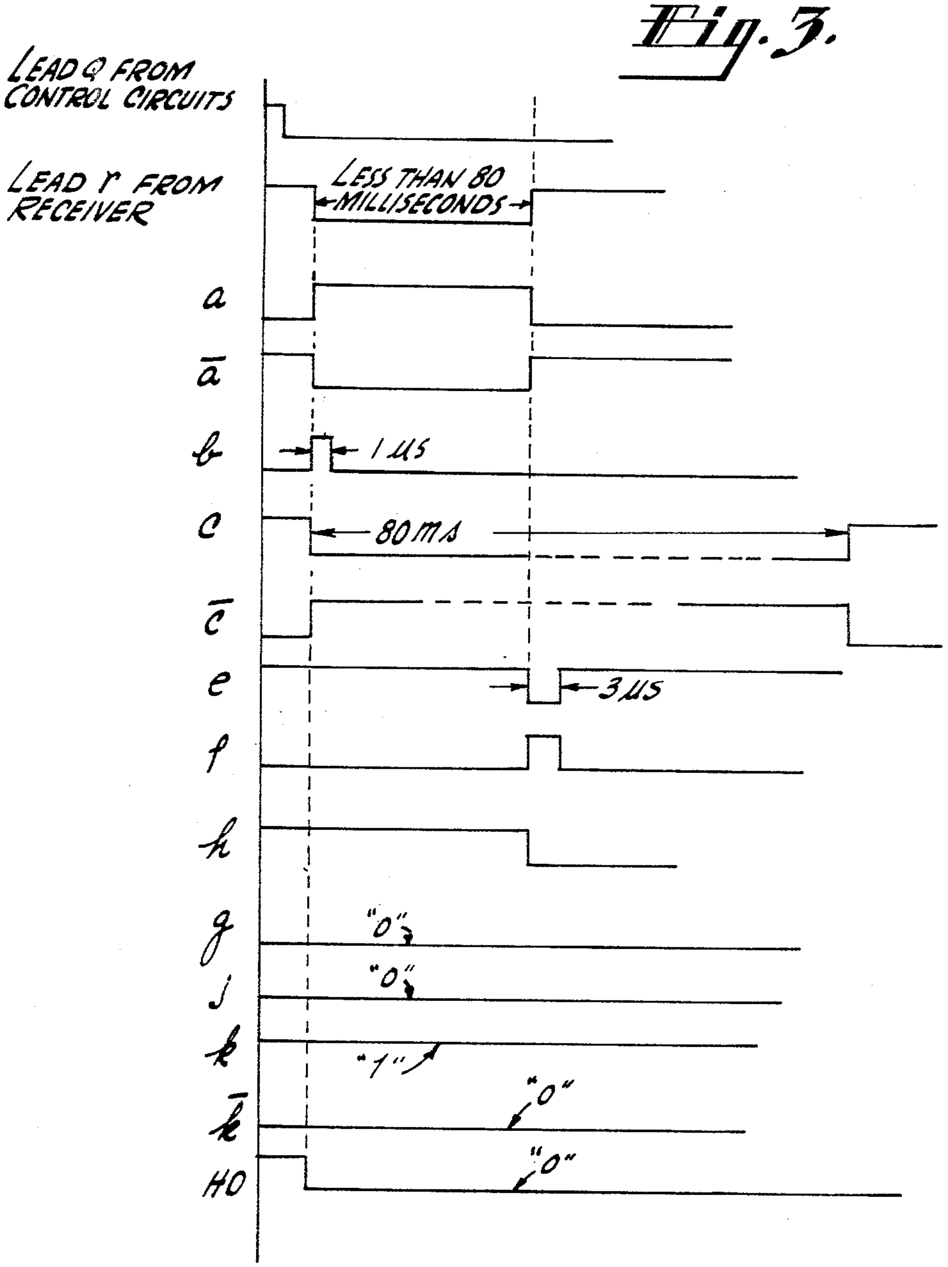
FIGURES 3–5 are drawings of waveforms present in the circuit of FIGURE 2 under three different conditions, respectively.
Figure 4:
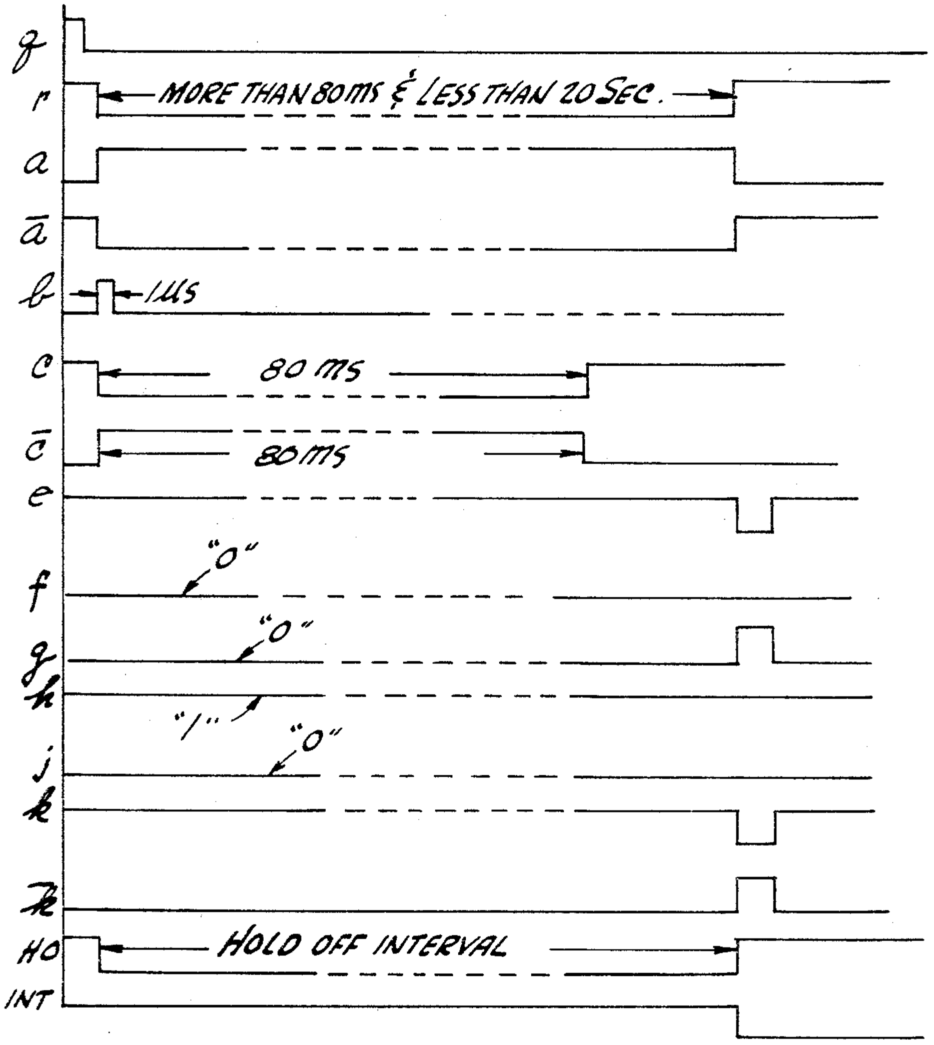
Figure 5:
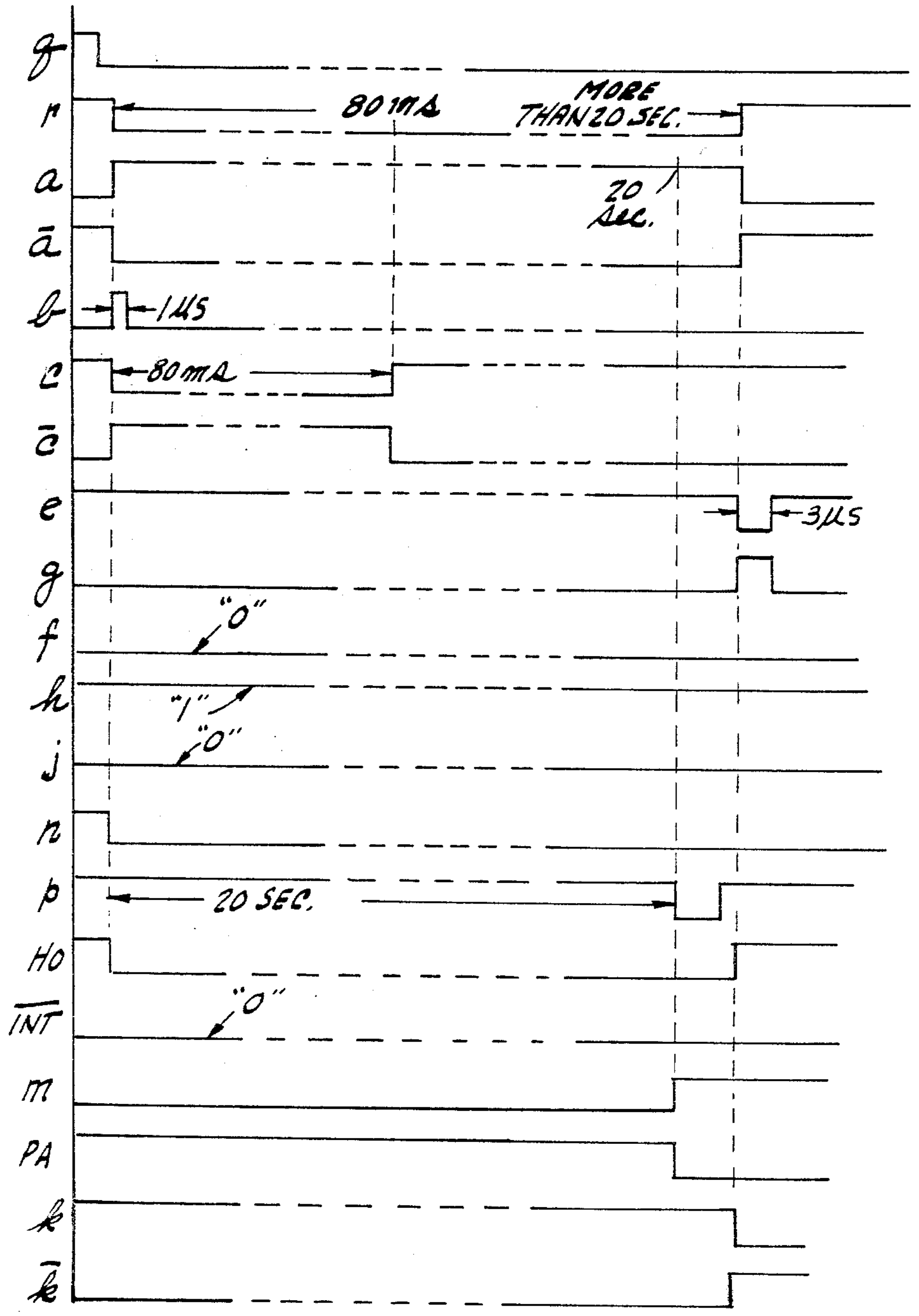

The operation of the circuit of FIGURE 2 is depicted in FIGURES 3, 4 and 5. The waveforms of FIGURE 3 show the operation of the circuit in response to the unauthorized depression of a character key. It is assumed that at the time of this depression a $q=0$ signal is present, indicating that the data processing machine is available to receive an interrupt signal. In addition, all of the flip-flops of the circuit of FIGURE 2 are reset, having been reset by a general reset signal from the control circuits of the computer. This reset connection is assumed but not shown.

Upon depression of a character key on the keyboard, the signal $r$ drops low, that is represents the bit "0," for an interval of less than 80 milliseconds. As $q$ and $r$ are both low, NOR gate 26 produces an output $a=1$, as indicated in FIGURE 3, and inverter 30 produces an output of $\overline{a}=0$.

In response to the input $a=1$, the pulse generator 28 generates a 1 microsecond duration pulse $b=1$. This pulse triggers pulse generator 34 and it produces a $c=0$ output and a $\overline{c}=1$ output, each said output having a duration of 80 milliseconds. Additionally, the $b=1$ signal sets flip-flop 32 causing it to produce an output HO=0. This HO=0 signal is applied to control circuits 18 of the data processing machine. It is a command to the data processing machine to continue performing its program for the present pending a determination of whether the signal just received from the teletypewriter is an interrupt signal (a "request for service" or is, in fact, an extraneous signal.

At time $t_1$, which is less than 80 milliseconds, $\overline{a}$ changes from 0 back to 1. This transition causes the pulse generator 40 to generate a 3 microsecond pulse $e=0$. The two inputs $c$ and $e$ to NOR gate 44 are now both 0 causing this NOR gate to become enabled and to produce a $f=1$ output. $f=1$ is a set signal for flip-flop 38 and its output $h$ thereupon changes its value from 1 to 0. At this time, which is still within the 80 millisecond interval, $\overline{c}$ is a 1 so that NOR gate 50 is disabled. Therefore, $j$ is 0. $g$ is also 0 since $\overline{c}$ is 1. Therefore, $k$ is 1 and $\overline{k}$ is 0. Accordingly, flip-flop 32 remains in a set condition and HO remains 0.

The interrupt command to the data processing machine is the signal INT=0. However, flip-flop 46 is initially reset so that INT is initially a 1. Under the conditions just discussed, NOR gate 42 never becomes enabled and $g$, therefore, continues to remain a 0. Therefore, flip-flop 46 never becomes set and the interrupt command INT=0 is not generated. In summary, it has been shown that when the current on line 14, 15 (FIGURE 1) drops to 0 for an interval of less than 80 milliseconds, the interrupt command INT=0 is not generated.

The waveforms of FIGURE 4 depict the circuit operation when the interrupt key on the teletypewriter has been depressed. It will be recalled from the introductory discussion, that this action causes the current on the line 14, 15 (FIGURE 1) to drop to 0 for an interval somewhat greater than 80 milliseconds. Correspondingly, the signal $r$ drops low (represents 0) also for an interval somewhat greater than 80 milliseconds. The waveforms $a$ and $\overline{a}$ have a duration equal to that of the signal $r$. The 1 microsecond pulse $b$ produced by pulse generator 28 in response to the 0-to-1 transition is applied as a set signal to flip-flop 32, a reset signal to flip-flop 38, and a triggering signal to pulse generator 34. The later generates the signals $c$ and $\overline{c}$, each of which has a duration of 80 milliseconds. However, during this 80 millisecond interval, the pulse generator 40 is not triggered so that $e$ is a 1 and NOR gate 44 remains disabled.

When the trailing edge of the wave $a$ occurs, that is, the 0-to-1 transition of $\overline{a}$, pulse generator 40 is triggered and produces an output $e=0$. At this time $\overline{c}$ is also equal to 0 and, therefore, the output $g=1$ is generated. This output sets flip-flop 46 and it produces an interrupt signal INT=1 which is transmitted to the control circuits of the data processing machine.

Returning for a moment to the time at which the signal $b=1$ is generated, this signal sets the flip-flop 32 and the flip-flop generates the hold-off signal HO=0. Later, when the signal $g=1$ occurs, NOR gate 48 becomes disabled changing $k$ from 1 to 0. Inverter 52 thereupon applies the signal $\overline{k}=1$ to flip-flop 32 resetting this flip-flop and changing the hold-off signal HO from 0 to 1 The hold-off signal HO=1, indicates to the control circuits of the computer that the drop in line current to zero is, in fact, a true interrupt request After the data processor receives a true interrupt request, as discussed above, its control circuits generate a signal RI=1 indicating to the circuits of FIGURE 2 that the interrupt command has been received and that appropriate action will be taken in due course. This signal RI=1 resets the flip-flop 46. As an aside, the INT=0 signal is generally stored in the memory 22 until the program terminates or until some other time at which is appropriate to provide access to the teletypewriter 10.

In the normal course of events, in a reasonable amount of time, after the signal RI has been generated, the lamp at the keyboard will go on and the operator may send his message to the data processing machine. However, if the machine ignores the interrupt request for a time that the operator considers to be excessive, the latter may again depress the interrupt key and cause the INT=0 again to occur.

A brief word may be in order at this point as to the way in which the $q=0$ signal is generated. As already mentioned, the control circuits 18 perform this function. When these circuits determine, for example, that the program being run may be interrupted, they cause a read flip-flop or a write flip-flop to be set. One of these flip-flops indicates that information may be sent from the data processing machine to the teletypewriter and the others that the reverse may occur. An OR gate receives the output of these flip-flops and when either one is set the OR gate generates the signal $q=1$ and thereby inhibits the circuit 24 of FIG. 2.

The waveforms of FIGURE 5 trace the operation of the circuit of FIGURE 2 when the interruption in line current is for an interval greater than 20 seconds. Such an interruption is interpreted as a power failure or other catastrophic event. Upon the occurrence of an interruption of this duration, the circuit of FIGURE 2 generates an alarm PA which is an indication that manual intervention is required.

The waveforms of FIGURE 5 are more or less self-explanatory. If $n$, the output of flip-flop 54 remains a 0 for an interval of 20 seconds, the 20 second counter and pulse generator 56 generates a negative-going pulse $p$ indicative of a 0. In practice, the circuit 56 may be a clock (either mechanical or electrical) and means such as a decoder connected to the clock for sensing the count of 20 seconds. During this same time (within the twenty second interval), the signal HO continues to be zero as no reset signal $\bar{k}=1$ has been generated by the inverter 52. During the same interval, NOR gate 42 has remained disabled so that flip-flop 46 has remained in a reset condition. In its reset condition, the $\overline{\text{INT}}$ output of flip-flop 46 is a 0. Accordingly, all three inputs to NOR gate 58 are 0 and $m$ changes to a 1. This $m=1$ signal is a set signal for flip-flop 60 and causes the power alarm signal PA=0 to be generated.

If th signal $v=1$ occurs prior to the expiration of the 20 second delay interval of circuit 56, flip-flop 54 is reset and $n$ changes back to 1. This disables the circuit 56 and automatically resets the clock.

The PA=0 signal is stored in the memory 22 (FIG. 1) of the data processing machine and, after appropriate RPA for the flip-flop 60. As in the case of the flip-flop 46, if the problem is not corrected after a certain amount of time, the same cycle as discussed above may be repeated and the signal PA=0 again generated.

What is claimed is:

1. In a system including a teletypewriter having an interrupt key which, when depressed, transmits an interrupt signal having a duration within a given range and character keys which, when depressed, transmit character signals of shorter duration than said interrupt signal, a circuit receptive of said signals for distinguishing the interrupt signals from the character signals comprising, in combination,
   - first means for generating a relatively long, first enabling signal, in response to the receipt of a signal from said teletypewriter, which starts an interval after the leading edge of the teletypewriter signal equal to the minimum interrupt signal duration;
   - second means for generating a relatively short, second enabling signal, in response to the receipt of a signal from said teletypewriter, which starts at the trailing edge of the teletypewriter signal; and
   - a coincidence gate responsive to the concurrent receipt of said first and second enabling signals for producing an output indicative of the presence of said interrupt signal.

2. In a system including a teletypewriter having an interrupt key which, when depressed, transmits an interrupt signal having a duration within a given range capable of at least simulating the transmission of signals of a second duration which is substantially longer than that of said interrupt signal, a circuit receptive of said signals for distinguishing an interrupt signal from said longer duration signal comprising, in combination,
   - first means for generating a relatively long, first enabling signal, in response to the receipt of a signal from said teletypewriter, which starts an interval after the leading edge of the teletypewriter signal equal to the minimum interrupt signal duration;
   - second means for generating a relatively short second enabling signal, in response to the receipt of a signal from said teletypewriter, which starts at the trailing edge of the teletypewriter signal;
   - third means for generating a third enabling signal, in response to the receipt of a signal from said teletypewriter, which starts an interval after the leading edge of the teletypewriter signal, equal to said second duration; and
   - means responsive to the absence of the second enabling signal and the concurrent presence of the third enabling signal and a signal transmitted from the teletypewriter, for generating an output indicative of the presence of a teletypewriter signal of said second duration.

3. In a system including a teletypwriter having an interrupt key, which, when depressed, transmits an interrupt signal having a duration within a given range and character keys which, when depressed, transmit character signals of shorter duration than said interrupt signal and which is also capable of at least simulating the transmission of signals of a third duration which is longer than that of said interrupt signal, a circuit receptive of said signals for distinguishing the interrupt signals from all other signals comprising, in combination,
   - first means for generating a relatively long, first enabling signal, in response to the receipt of a signal from said teletypewriter, which starts an interval after the leading edge of the teletypewriter signal equal to the minimum interrupt signal duration;
   - second means for generating a relatively short, second enabling signal, in response to the receipt of a signal from said teletypewriter, which starts at the trailing edge of the teletypewriter signal;
   - a concidence gate responsive to the concurrent receipt of said first and second enabling signals for producing an output indicative of the presence of said interrupt signal;
   - third means for generating a third enabling signal, in response to the receipt of a signal from said teletypewriter, which starts an interval after the leading edge of the teletypewriter signal, equal to said third duration; and
   - means responsive to the concurrent presence of the third enabling signal and a signal transmitted from the teletypewriter, and the absence of the second enabling signal, for generating an alarm.

4. In a system including a data transmission device which, in response to one stimulus, transmits an interrupt signal having a duration within a given range, in response another stimulus, transmits character signals of shorter duration than said interrupt signal and, in response to a third stimulus, transmits signals of a third duration which is longer than that of said interrupt signals, a circuit receptive of said signals for distinguishing the interrupt signals from all other signals comprising, in combination,
   - first means for generating a relatively long, first enabling signal, in response to the receipt of a signal from said device, which starts an interval after the leading edge of the device signal equal to the minimum interrupt signal duration;
   - second means for generating a relatively short, second enabling signal, in response to the receipt of a signal from said device, which starts at the trailing edge of the device signal;
   - third means for generating a third enabling signal, in response to the receipt of a signal from said device, which starts an interval after the leading edge of the device signal, equal to said third duration; and
   - means responsive to the concurrent presence of the third enabling signal and a signal transmitted from the device, and the absence of the second enabling signal, for generating an alarm.

5. In a system including a teletypewriter having an interrupt key which, when depressed, transmits an interrupt signal having a duration within a given range and character keys which, when depressed, transmit character signals of shorter duration than said interrupt signal, and which simulates the transmission of a signal of a third duration, which is longer than that of said interrupt signal, when there is a power failure, a data processing system, and a pair of wires over which the teletypewriter signals are transmitted interconnecting the teletypewriter with the data processing system, a circuit connected to said line and receptive of said signals for distinguishing the interrupt signals from all other signals comprising, in combination, first means for generating a relatively long, first enabling signal, in response to the receipt of a signal from said teletypewriter, which starts an interval after the leading edge of the teletypewriter signal equal to the minimum interrupt signal duration;

second means for generating a relatively short, second enabling signal, in response to the receipt of a signal from said teletypewriter, which starts at the trailing edge of the teletypewriter signal;

a coincidence gate responsive to the concurrent presence of said first and second enabling signals for producing an output indicative of the presence of said interrupt signal;

third means for generating a third enabling signal, in response to the receipt of a signal from said teletypewriter, which starts an interval after the leading edge of the teletypewriter signal, equal to said third duration; and means responsive to the concurrent presence of the third enabling signal and a signal transmitted from the teletypewriter, and the absence of the second enabling signal, for generating an output indicative of a signal of said third duration.

References Cited

UNITED STATES PATENTS 3,281,527 10/1966 Davis ---------------- 178—3

THOMAS B. HABECKER, *Primary Examiner.*

U.S. Cl. X.R.

340—172.5